(12) United States Patent
Steed et al.

(10) Patent No.: US 6,484,471 B2
(45) Date of Patent: Nov. 26, 2002

(54) ADHESIVE FIXED ANCHORS

(75) Inventors: William G. Steed, New Westminster (CA); David Langtry, Port Coquitlam (CA)

(73) Assignee: Patent Applied Technology, Winnipeg (CA)

( * ) Notice: Subject to any disclaimer, the term of this patent is extended or adjusted under 35 U.S.C. 154(b) by 0 days.

(21) Appl. No.: 09/809,354

(22) Filed: Mar. 16, 2001

(65) Prior Publication Data

US 2001/0034981 A1 Nov. 1, 2001

Related U.S. Application Data

(60) Provisional application No. 60/191,118, filed on Mar. 22, 2000.

(51) Int. Cl.[7] .................................................. E21D 21/00
(52) U.S. Cl. ............................. 52/704; 52/707; 52/105; 411/82; 405/259.5
(58) Field of Search .................... 52/704, 707, 105; 411/82, 82.3, 930; 405/259.5

(56) References Cited

U.S. PATENT DOCUMENTS

| | | | | |
|---|---|---|---|---|
| 4,034,567 A | * | 7/1977 | Roggen | |
| 4,652,193 A | * | 3/1987 | Hibbs | 411/82 |
| 4,659,268 A | * | 4/1987 | Del Mundo et al. | 411/82 X |
| 4,747,727 A | * | 5/1988 | Berchtold et al. | 52/704 X |
| 5,193,958 A | * | 3/1993 | Day | 411/82 |
| 5,315,800 A | * | 5/1994 | Weber et al. | 52/309.1 |
| 5,328,300 A | * | 7/1994 | Fischer et al. | 405/256.6 |
| 5,888,334 A | * | 3/1999 | Abraham | 52/707 X |

FOREIGN PATENT DOCUMENTS

| | | | | |
|---|---|---|---|---|
| DE | 4121620 A | * | 1/1993 | 411/930 |
| GB | 1350749 | * | 4/1974 | 52/704 |
| GB | 1351282 | * | 4/1974 | 52/704 |

* cited by examiner

*Primary Examiner*—Carl D. Friedman
*Assistant Examiner*—Brian E. Glessner
(74) *Attorney, Agent, or Firm*—Ryan W. Dupuis; Adrian D. Battison; Michael R. Williams

(57) ABSTRACT

An anchoring member is provided for anchoring an object to a supporting surface having a bore for receiving the anchoring member. The anchoring member comprises an elongate cylindrical body having a penetrating end arranged to be embedded in the bore and an exposed end opposite the penetrating end. The exposed end is configured differently than the penetrating end for distinguishing which end is to be embedded into the bore. At least part of the outer surface of the body is threaded adjacent the exposed end. An adhesive compound arranged to be coated about the penetrating end of the body secures the body within the bore. A heat generating compound located within a chamber in the body generates ambient heat for assisting in setting and curing the adhesive compound for anchoring the body in the bore.

20 Claims, 2 Drawing Sheets

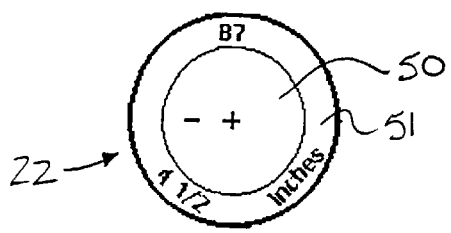
FIG. 2
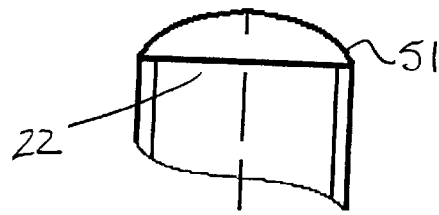
FIG. 3
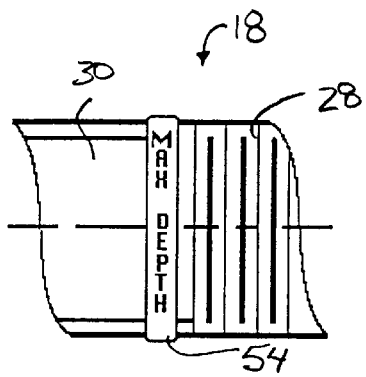
FIG. 4
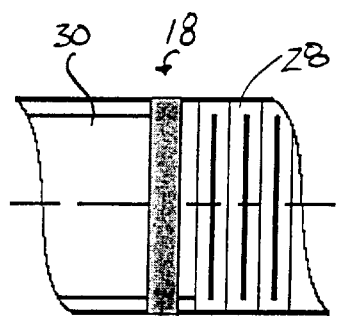
FIG. 5
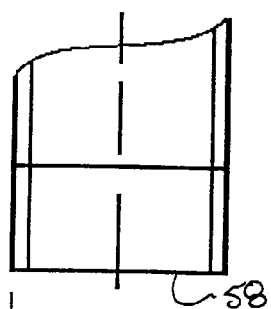
FIG. 6A
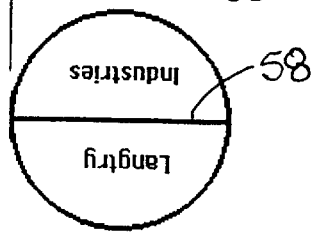
FIG. 6B
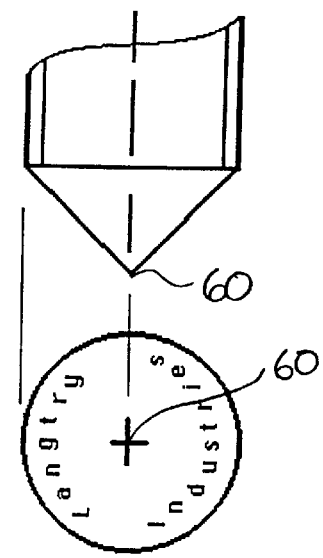
FIG. 7A
FIG. 7B

ADHESIVE FIXED ANCHORS

The present application claims the benefits under 35 U.S.C 119 (e) from U.S. Provisional Application No. 60/191,118 filed Mar. 22, 2000.

FIELD OF THE INVENTION

This invention relates to anchors and more particularly to anchors of the type which are embedded into a bore in a supporting surface and secured in the bore using adhesive.

BACKGROUND

When using solid base materials like concrete in a supporting structure it is common to anchor fittings, brackets and the like to the base material using various types of adhesives. The process generally involves boring a hole into the base material and then cleaning the hole such that a threaded rod can be anchored therein. The hole is filled with a two part epoxy mix including epoxy and a suitable hardener which have been mixed together in liquid form. The rod is inserted into the hole and is subsequently anchored in place when the epoxy has cured.

The threaded rods which are used for anchoring generally do not include any type of required depth marker. Identifying marks such as those used to indicate the type and material of the rod is made from are sometimes placed on one or both ends of the rod. When using this type of rod which is threaded along its entire length, it is possible for an unscrupulous contractor to cut the rods at any point in their length in order to double the quantity of material and save in drilling costs ate the expense of retaining strength. The lack of any means for indicating the correct depth to embed the rods also permits the rods to be accidentally embedded to an incorrect depth, thus producing a weakened joint or a lack of threaded length above the surface for anchoring purposes. Furthermore, the identifying marks on the ends of the rod are frequently obliterated by the process of driving the rod into the epoxy filled hole.

Other problems associated with the use of threaded rods anchored in epoxy are related to the use of the epoxy. In the case of a two part epoxy compound, ambient temperature has an important effect on the setting and curing times. This is aggravated in colder climates and in many cases precludes the use of such anchors as the ambient temperature does not allow the epoxy to set and cure properly. Even in moderate climates, set times can be relatively long and cause delays in construction in the absence of sufficient heat in proximity to the epoxy compound.

SUMMARY

According to one aspect of the present invention there is provided an anchoring member for anchoring an object to a supporting surface having a bore for receiving the anchoring member therein, the anchoring member comprising:

an elongate cylindrical body having a penetrating end and an exposed end opposite the penetrating end;

the exposed end being configured differently than the penetrating end for distinguishing which end is to be embedded into the bore;

the body having an outer surface which is at least partially threaded adjacent the exposed end; and an adhesive compound arranged to be coated about the penetrating end of the body for securing the body within the bore.

When using conventional threaded rod as an anchor member, cutting the rod in half permits both halves to be used without an means for an inspector to determine if an installed anchor member meets the intended strength requirements. The arrangement of the present invention in which one end of the anchoring member is configured differently from the other ensures that one end of the rod can be distinguished from the other, thus. providing no incentive for persons to cut the anchoring members in half as only the half having the distinguishing characteristics of the differently configured end would be able to pass inspection once installed.

The exposed end of the body preferably includes a raised central portion extending outward in a longitudinal direction of the body in relation to a surrounding peripheral surface including indicia thereon. The raised central portion may include a flat end face which is perpendicular to the longitudinal direction of the body. The raised central portion is thus arranged to receive the blows from a hammer used to drive the anchoring member into the bore such that the threads remain intact after installation and any surrounding indicia remain readable after installation.

The penetrating end may be arranged so as to be tapered towards a leading edge extending diametrically across the penetrating end of the body and projecting outward in the longitudinal direction of the body for assisting the body in being penetrated into the bore. In a further variation the penetrating end may be tapered towards a pointed end projecting outward in the longitudinal direction of the body. Alternatively, the penetrating end may comprise a domed end face having a central portion which is raised outward-in a longitudinal direction of the body.

Preferably, only a portion of the outer surface adjacent the exposed end is threaded with a remaining portion of the outer surface being configured for gripping within the bore.

For indicating a recommended depth of penetration of the body into the bore, there may be provided an annular recess formed about the outer surface of the body spaced between the respective ends of the body. Alternatively, there may be provided a ring of marking material secured about the body spaced between the respective ends of the body, the annular recess corresponding to a recommended depth of penetration of the body into the bore.

A heat generating chamber may be arranged to extend longitudinally through the body from an opening adjacent the exposed end of the body to a terminal end adjacent the penetrating end of the body. A heat generating compound is then preferably located within the chamber whereby activation of the heat generating compound will generate ambient heat for assisting in setting and curing the adhesive compound for anchoring the body in the bore.

According to a second aspect of the present invention there is provided an anchoring member in combination with a supporting surface having a bore therein, the anchoring member comprising:

an elongate cylindrical body having a penetrating end embedded into the bore and an exposed end opposite the penetrating end which projects outward from the bore;

the exposed end being configured differently than the penetrating end;

the body having an outer surface which is at least partially threaded adjacent the exposed end; and an adhesive compound applied between the penetrating end of the body and the surrounding bore for securing the body within the bore.

The exposed end of the body may include a raised central portion extending outward in a longitudinal direction of the body in relation to a surrounding peripheral surface including indicia thereon.

The penetrating end may further be tapered towards a leading edge projecting outward in the longitudinal direction of the body.

As described above, an annular marking about the outer surface of the body spaced between the respective ends of the body is useful for indicated a recommended depth of installation of the body into the bore. Upon installation, the annular marking is preferably aligned with the supporting surface where the bore exits the supporting surface.

Preferably, only a portion of the outer surface adjacent the exposed end is threaded with a remaining portion of the outer surface being configured for gripping within the bore.

According to a further aspect of the present invention there is provided an anchoring member for anchoring an object to a supporting surface having a bore for receiving the anchoring member therein, the anchoring member comprising:

an elongate cylindrical body having a penetrating end which is arranged to be penetrated into the bore and an exposed end opposite the penetrating end;

the body having an outer surface which is at least partially threaded adjacent the exposed end;

a heat generating chamber extending longitudinally through the body from an opening adjacent the exposed end of the body to a terminal end adjacent the penetrating end of the body;

an adhesive coating arranged to be coated about an embedded portion of the body adjacent the penetrating end; and a heat generating compound located within the chamber;

whereby activation of the heat generating compound will generate ambient heat for assisting in setting and curing the adhesive coating for anchoring the body in the bore.

When the exposed end of the body includes a raised central portion extending outward in a longitudinal direction of the body in relation to a surrounding peripheral surface, the opening of the heat generating chamber is preferably located at the raised central portion with a cap arranged to be secured to the raised central portion for covering the opening.

The heat generating compound may be arranged to react with oxygen to produce an exothermic reaction for activation of the heat generating compound by removing the cap so as to uncover the opening of the heat generating chamber.

BRIEF DESCRIPTION OF THE DRAWINGS

In the accompanying drawings, which illustrate exemplary embodiments of the present invention:

FIG. 2 is a top plan view of the anchor of FIG. 1.

FIG. 3 is an alternative embodiment of the exposed end of the anchor of FIG. 1.

FIGS. 4 and 5 are alternative arrangements of the depth indicator of the anchor of FIG. 1.

FIGS. 6A and 6B are respective side elevational and bottom plan views of an alternative embodiment of the penetrating end of the anchor of FIG. 1.

FIGS. 7A and 7B are respective side elevational and bottom plan view of a further embodiment of the penetrating end of the anchor of FIG. 1.

DETAILED DESCRIPTION

Figure 1:
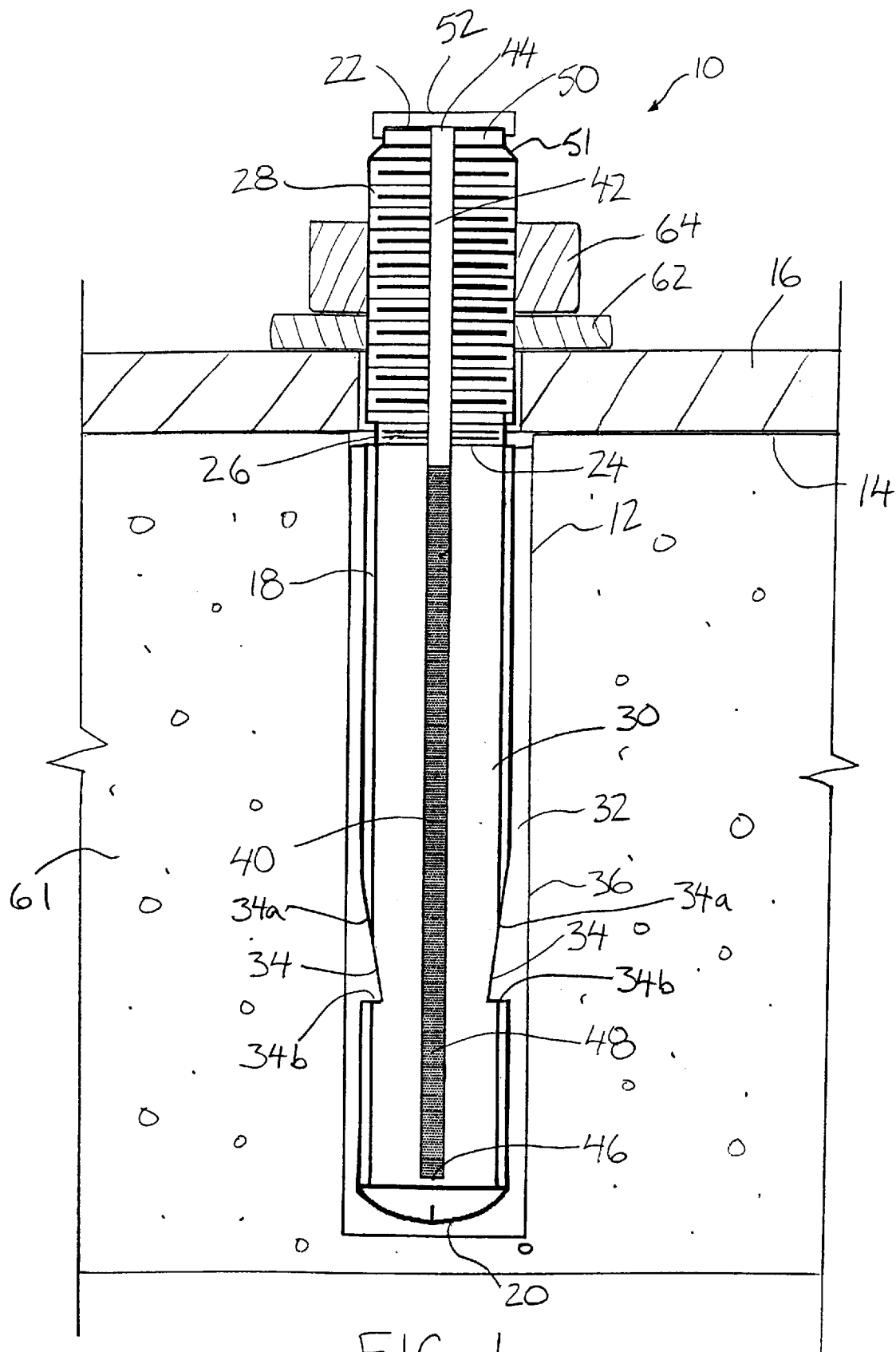
FIG. 1 is a partly sectional side elevational view of an anchor shown embedded into a bore in a supporting surface.

Referring to the accompanying drawings, there is illustrated an anchor generally indicated by reference numeral 10. The anchor 10, is arranged to be secured within a bore 12 in a supporting surface 14 for anchoring brackets 16 and the like to the supporting surface.

The anchor 10 comprises an elongate rod 18 which extends,, longitudinally from a penetrating end 20 to an exposed end 22. The penetrating end 20 is arranged to be penetrated into the bore 12 while the exposed end 22 extends out from the bore to a position spaced outwardly from the supporting surface 14.

A depth indicator 24 is located about the rod 18 at a position spaced between the respective ends of the rod. The depth indicator 24 corresponds to a recommended depth of penetration of the penetrating end 20 into the bore 12 by aligning the depth indicator with an opening of the bore 12 at the supporting surface 14. The depth indicator 24 comprises an annular groove 26 about a periphery of the rod.

The penetrating end 20 includes a domed end face having a central portion which is raised outward in the longitudinal direction of the rod. The domed end face assists the anchor in being penetrated into a bore which has already been filled with adhesive compound for example.

The rod 18 includes an externally threaded portion 28 on an outer surface thereof which extends from the indicator 24 to the exposed end 22. An embedded portion 30 of the rod extends from the depth indicator 24 to the penetrating end 20. The embedded portion 30 includes layers of adhesive compound 32 coated thereon. The adhesive compound 32 is formed in layers so as to prevent the compound from mixing and being activated until heated. The adhesive compound thus remains inactive on the rod until after the rod is inserted into a bore and subsequently heated.

A plurality of notches 34 are located in an outer surface of the embedded portion for engaging inner walls 36 of the bore 12 or the surrounding adhesive compound once set and cured for restricting removal of the rod. Each notch includes an upper camming face 34a which is angled to allow the rod to be easily inserted into the bore as well as an engaging face 34b which extends radially from the rod for engaging the bore if the rod is pulled outwardly from the bore. The embedded portion is thus configured for gripping the walls of the bore.

A heat generating chamber 40 is provided in the form of an axially extending bore 42 which extends longitudinally through the rod from an opening 44 of the bore located at the exposed end 22 of the rod to a terminal end 46 adjacent the penetrating end 22 of the rod. The heat generating chamber 40 includes a heat generating compound 48 therein which substantially fills the chamber from a terminal end 46 to a level corresponding to the depth indicator 24 on an outer surface of the rod.

The heat generating compound 48 is a known compound which is activated on exposure to oxygen which causes an exothermic reaction which releases heat into the surrounding environment. Air is permitted to reach the compound through the opening 44 at the upper end of the heat generating chamber 40 when it is desired to activate the heat generating compound. The heat generated by the heat generating compound 48 is sufficient to activate the adhesive compound 32 and improves setting and curing times of the adhesive compound.

The exposed end 22 includes a raised protrusion 50 of reduced diameter which is raised outward from the end of the rod in the longitudinal direction of the rod in relation to a surrounding peripheral surface 51. The surface 51 includes indicia thereon for indicating appropriate specifications of the anchor which are desirable to remain readable after installation of the anchor. The raised protrusion 50 is arranged to receive a removable cap 52 thereon. The cap covers the opening to the heat generating chamber and remains selectively separable from the raised protrusion for selective activation of the heat generating compound. In an alternate arrangement, the opening may be capped with a diaphragm (not shown) such that the heat generating compound 48 is not exposed to air until the diaphragm has been perforated.

The raised protrusion 50 prevents damage to the indicia on the surrounding peripheral surface 51 and also prevents damage to the threaded portion 28 of the rod due to hammer blows when the rod is driven into the bore. The protrusion absorbs the deformation caused by the hammer as opposed to damaging the threads or the indicia. The protrusion 50 includes a flat end face which is perpendicular to the longitudinal direction of the rod for receiving the hammer blows.

In a further variation as shown in FIG. 3, the raised protrusion at the exposed end 22 may be dome shaped having a central portion which is raised outward in the longitudinal direction of the rod in relation to a surrounding peripheral surface as above. Deformations resulting from hammer blows are thus concentrated towards the center of the rod such that the threads about a periphery of the rod remain undamaged. The raised protrusion also allows markings relating to the specifications of the rod to be inscribed on the exposed end of the rod adjacent the periphery thereof such that the markings are not obliterated by hammer blows driving the rod into the bore.

As shown in FIGS. 4 and 5, further variations of the depth indicator 24 are also possible. In one arrangement shown in FIG. 4, the annular groove 26 may be replaced by a strip of shrink wrap 54 which is secured about a periphery of the rod between the threaded portions and the embedded portions of the rod. Alternatively as shown in FIG. 5, marking material such as a coloured stripe of paint 56 about the periphery of the rod also serves to indicate the appropriate depth to penetrate the rod.

Further variations to the penetrating end 20 of the rod are shown in FIGS. 6 and 7. In FIGS. 6A and 6B, the penetrating end is tapered towards a leading edge 58 which extends diametrically across the penetrating end. As shown in FIGS. 7A and 7B, the penetrating end 20 may also be tapered towards a single pointed apex 60.

The anchor 10 is generally used when it is desired to anchor a bracket to a supporting surface comprising a solid base material, for example concrete 61. The bore 12 is first drilled into the concrete and then cleaned before inserting the rod and the adhesive compound into the bore. Exposing the heat generated compound to oxygen by removing the cap 52 will allow the compound to release sufficient heat to rapidly set and cure the adhesive compound by releasing heat directly into the surrounding adhesive and concrete. Residual heat in the concrete will continue to heat the adhesive compound even after the heat generating compound has discontinued to release heat. With the rod secured in place, the bracket 16 or other similar object can be mounted to the supporting surface by inserting the threaded portion through an aperture therein. The use of a washer 62 and a nut 64 threadably secured to the threaded portion 28 fixes the bracket in place when the nut is tightened.

When using a rod 18 which does not include the layers of adhesive compound 32 coated thereon, a conventional two part mix of epoxy may be preferable to use as an adhesive by filling the bore first and then driving the rod into the bore filled with epoxy before the epoxy sets.

The use of a heat generating compound 48 which is integral within the anchor 10, allows the anchor to be used in various environments regardless of climate while realising relatively short setting and curing times of the adhesive compound. The benefits of the heat generating compound are also realised when using various types of adhesives and epoxies having setting and curing times which are reduced when heat is added.

The heat generating compound 48 may be replaced with any type of compound or device capable of generating sufficient heat to reduce the curing time of the compounds. Other variations to the heat generating compound include compounds which require mechanical mixing in order to be activated so as to generate heat.

A further embodiment to the anchor may comprise a length of threaded rod which includes the heat generating chamber formed therein. The heat generating chamber thus provides the added benefit of reduced curing times in combination with the gripping force of conventional threaded rods.

While various embodiments of the present invention have been described in the foregoing, it is to be understood that other embodiments are possible within the scope of the invention. The invention is to be considered limited solely by the scope of the appended claims.

What is claimed is:

1. An anchoring member for anchoring an object to a supporting surface having a bore for receiving the anchoring member therein, the anchoring member comprising:
    an elongate cylindrical body having a penetrating end and an exposed end opposite the penetrating end;
    the exposed end being configured differently than the penetrating end for distinguishing which end is to be embedded into the bore;
    the body having an outer surface which is at least partially threaded adjacent the exposed end;
    an adhesive compound coated about the penetrating end of the body for securing the body within the bore;
    a heat generating chamber extending longitudinally through the body from an opening adjacent the exposed end of the body to a terminal end adjacent the penetrating end of the body; and
    a heat generating compound located within the chamber whereby activation of the heat generating compound will generate ambient heat for assisting in setting and curing the adhesive compound for anchoring the body in the bore.

2. The anchoring member according to claim 1 wherein the exposed end of the body includes a raised central portion extending outward in a longitudinal direction of the body in relation to a surrounding peripheral surface including indicia thereon.

3. The anchoring member according to claim 2 wherein the raised central portion includes a flat end face which is perpendicular to the longitudinal direction of the body.

4. The anchoring member according to claim 1 wherein the exposed end of the body includes a raised central portion extending outward in a longitudinal direction of the body in relation to a surrounding peripheral surface and wherein the penetrating end is tapered towards a central portion raised outward in the longitudinal direction of the body.

5. The anchoring member according to claim 1 wherein the penetrating end is tapered towards a pointed end projecting outward in the longitudinal direction of the body.

6. The anchoring member according to claim 1 wherein the penetrating end is tapered towards a leading edge extending diametrically across the penetrating end of the body and projecting outward in the longitudinal direction of the body.

7. The anchoring member according to claim 1 wherein the penetrating end includes a domed end face having a central portion which is raised outward in a longitudinal direction of the body.

8. The anchoring member according to claim 1 wherein only a portion of the outer surface adjacent the exposed end is threaded with a remaining portion of the outer surface being configured for gripping within the bore.

9. The anchoring member according to claim 1 wherein there is provided an annular recess formed about the outer surface of the body spaced between the respective ends of the body, the annular recess corresponding to a recommended depth of penetration of the body into the bore.

10. The anchoring member according to claim 1 wherein there is provided a ring of marking material secured about the body spaced between the respective ends of the body, the ring of marking material corresponding to a recommended depth of penetration of the body into the bore.

11. An anchoring system for anchoring an object to a supporting surface having a bore therein, the anchoring system comprising:
   an anchoring member for being received in the bore, the anchoring member comprising:
      an elongate cylindrical body having a penetrating end which is arranged to be penetrated into the bore and an exposed end opposite the penetrating end;
      the body having an outer surface which is at least partially threaded adjacent the exposed end;
      a heat generating chamber extending longitudinally through the body from an opening adjacent the exposed end of the body to a terminal end adjacent the penetrating end of the body; and
      a heat generating compound located within the chamber; and
   an adhesive compound for surrounding an embedded portion of the body adjacent the penetrating end;
   whereby activation of the heat generating compound will generate ambient heat for assisting in setting and curing the adhesive compound for anchoring the body in the bore.

12. The system according to claim 11 herein the exposed end of the body includes a raised central portion extending outward in a longitudinal direction of the body in relation to a surrounding peripheral surface.

13. The system according to claim 12 wherein the opening of the heat generating chamber is located at the raised central portion and wherein there is provided a cap secured to the raised central portion for covering the opening.

14. The system according to claim 13 wherein the heat generating compound is arranged to react with oxygen to produce an exothermic reaction for activation of the heat generating compound by removing the cap so as to uncover the opening of the heat generating chamber.

15. The system according to claim 11 wherein the adhesive compound comprises a coating about the penetrating end of the anchoring member.

16. The system according to claim 15 wherein the coating of adhesive compound is formed in layers.

17. The system according to claim 11 wherein the adhesive compound comprises a curable adhesive which remains inactive until heated.

18. The system according to claim 11 wherein the heat generating chamber comprises an axially extending bore.

19. The system according to claim 18 wherein the bore extends through the exposed end of the body so as to define the opening of the heat generating chamber at the exposed end.

20. The system according to claim 11 wherein there is provided a sealing member spanning the opening of the heat generating chamber until installation of the anchoring member in the bore.

* * * * *